United States Patent Office 2,849,897
Patented Sept. 2, 1958

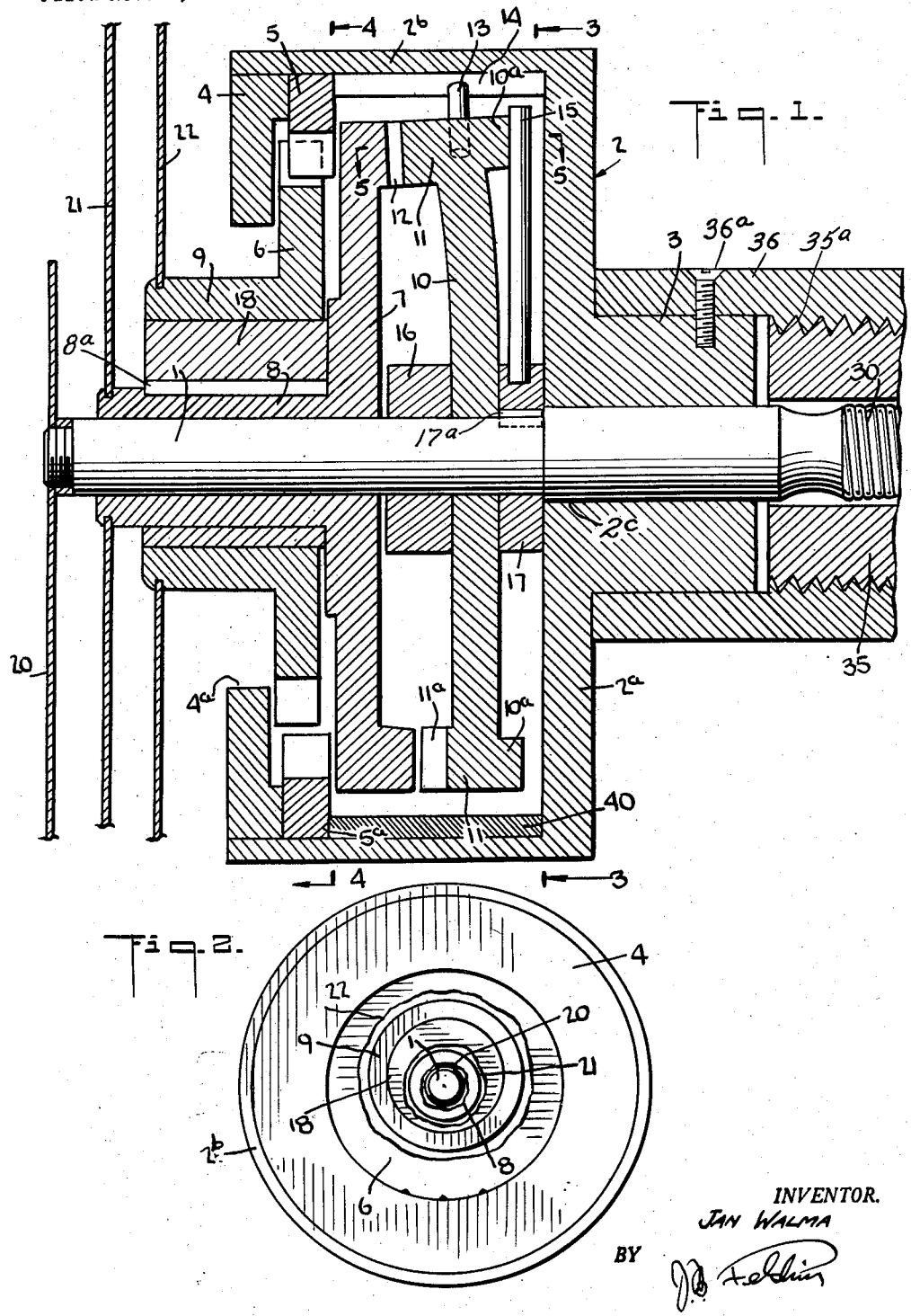

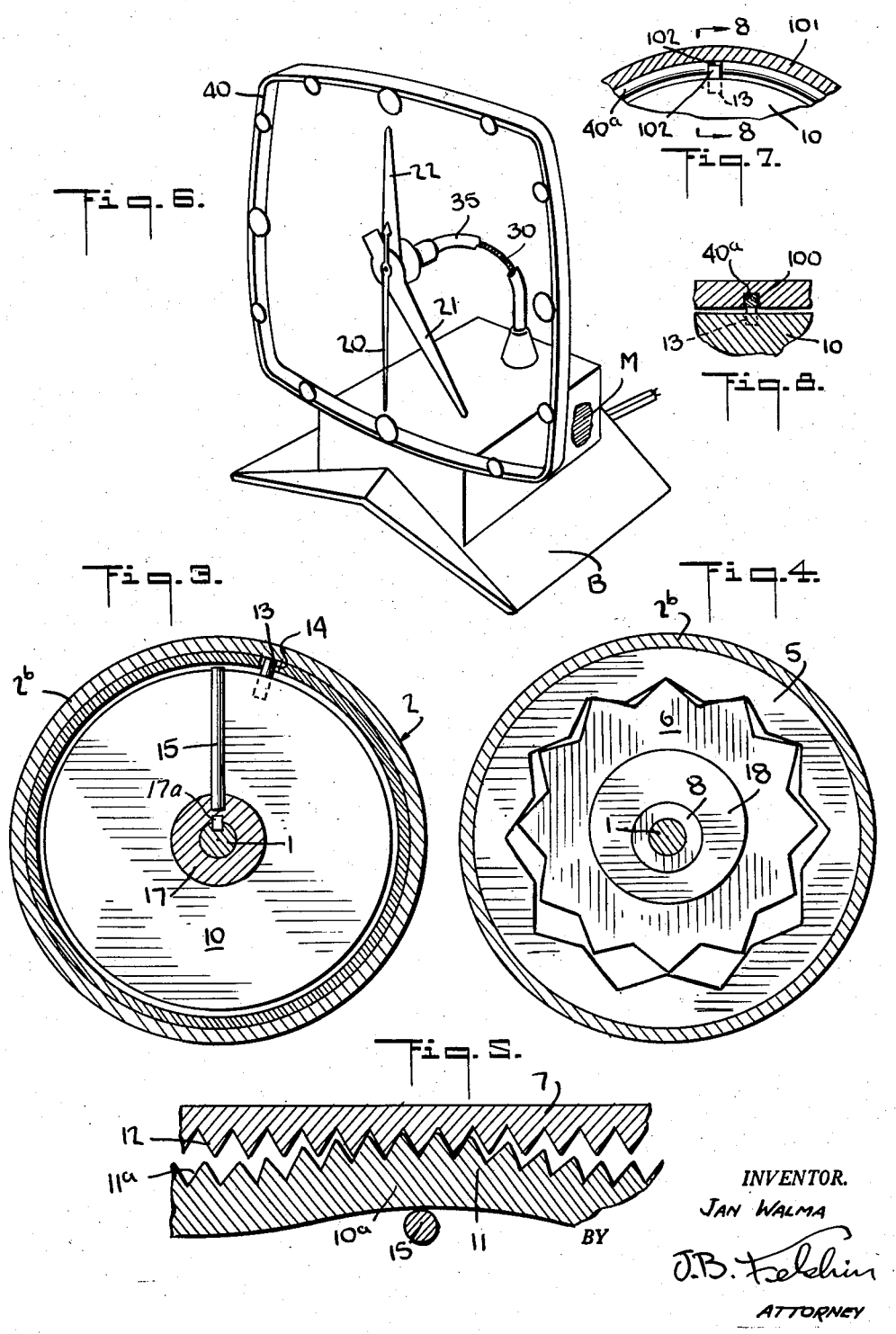

2,849,897

DRIVE FOR A STEP-UP OR STEP-DOWN GEAR

Jan Walma, The Hague, Netherlands, assignor to Leendert Prins, Bilthoven, Netherlands Application November 6, 1956, Serial No. 620,719

21 Claims. (Cl. 74—804)

This invention relates to a drive for a step-up or step-down gear, in which elements carrying teeth or the like are used. If in a drive of the type in question the transmission ratio is rather large, a great many parts are required which take up rather much room. The object of this invention is to provide a drive for a step-up or step-down gear in which elements carrying teeth or the like are used, for which drive a minimum of parts will suffice while the whole assembly admits of being accommodated in a very limited space.

According to the invention this object is achieved in that the ratio of the teeth of two co-operating elements carrying teeth or the like, or the drive, respectively, is so chosen that if the one element having for example $n$ teeth performs one complete revolution, said element or the other is displaced over less than $n$ teeth.

According to the invention it is possible to so choose the said ratios that when the one element has performed a complete revolution said element has exactly been displaced one tooth relative to the other element.

To achieve this end, various structural embodiments are possible, two of which will be discussed hereinafter.

According to the one embodiment the one teeth carrying element is formed by a stationary ring internally provided with teeth and the other teeth carrying element co-operating therewith is formed by a toothed wheel mounted for rotation on an eccentric.

According to another embodiment the one teeth carrying element is formed by a rotatable disc which has one of its end faces adjacent its periphery provided with teeth, and a non-rotatable corresponding disc co-axially displaced relative to the former disc, said non-rotatable disc admitting of being deformed in the direction of the other disc, the teeth of said non-rotatable disc locally meshing with those of the other disc.

Preferably, the deformable disc is controlled by a radially directed projection of the shaft on which the two discs are mounted, said disc being secured from rotation by an axially slidable locking pin.

The invention admits of being applied to the works of a clock in which case the ratio of the teeth on the teeth carrying elements is chosen as $n:(n-1)$. If applied to the works of a clock, the invention yields very good practical results, but it stands to reason that the invention is not limited to this mode of application.

Yet another object of this invention is to provide in a clock of the character described, highly improved means to permit easy setting of the clock to the correct time.

Another object of this invention is to provide a strong, rugged and durable device of the character described which shall be relatively inexpensive to manufacture, which shall be smooth, positive, accurate and quiet in operation, and which shall yet be practical and efficient to a high degree.

Other objects of this invention will in part be obvious and in part hereinafter pointed out.

The invention accordingly consists in the features of construction, combinations of elements and arrangement of parts which will be exemplified in the construction hereinafter described, and of which the scope of invention will be indicated in the following claims.

In the accompanying drawings in which is shown various illustrative embodiments of this invention:

Fig. 1 is a vertical cross-sectional view illustrating a device embodying the invention;

Fig. 2 is a front view thereof;

Fig. 3 is a cross-sectional view taken on line 3—3 of Fig. 1;

Fig. 4 is a cross-sectional view taken on line 4—4 of Fig. 1;

Fig. 5 is a cross-sectional view taken on line 5—5 of Fig. 1;

Fig. 6 is a perspective view of a clock provided with clockwork embodying the invention;

Fig. 7 is a detailed view illustrating a modified construction; and

Fig. 8 is a cross-sectional view taken on line 8—8 of Fig. 7.

The drawing shows a section of a driving means, to which the invention is applied, more particularly the driving means for a clock work, though the invention is not limited to this particular construction. The shaft 1 which is centrally arranged, is driven e. g. by a synchronous motor or by a spring motor. The shaft 1 is supported in bears in an enlarged portion 3 of a casing 2, which also contains the other elements of the drive. Said casing 2 has a circular end wall 2a from which extends a cylindrical wall 2b. Wall 2a has an opening 2c in which the shaft is journalled. The casing 2 is cup-shaped and closed at the upper side by a cover 4, having a central opening 4a. Between the cover 4 and an edge or shoulder 5a located in the outer edge of the casing wall 2b, an internally toothed ring 5 is provided which is fixed to the casing in any suitable manner, and adapted to cooperate with a flat externally toothed wheel 6, as will be explained hereinafter. The casing furthermore contains a flat toothed wheel 7, provided with a central shoulder or sleeve flange 8 through which shaft 1 passes. The flat toothed wheel 6 is provided with a central shoulder or sleeve flange 9 surrounding sleeve 8 but eccentric relative thereto. Fixed on sleeve 8 as by key or spline 8a, is an eccentric hub 18 on which sleeve 9 rotates. The casing 2 contains a second toothed disc 10 provided at the side facing casing wall 2a with a peripheral flange 10a and at the opposite side with a peripheral portion 11, in which the teeth 11a are provided. Said teeth 11a are co-axial with the shaft 1 and are opposed to peripherally arranged teeth 12 of the disc 7. The disc 10 is made of such a flexible material that it admits of being deformed, bent or flexed, and it is so mounted as to be not rotatable about the shaft 1, as will be explained hereinafter.

Frictionally engaged within the cylindrical wall 2b is a split sleeve or ring 40. The sleeve expands against the inner surface of said cylindrical wall and maintains its position by friction. This split sleeve or ring forms a longitudinal slot 14 between the adjacent ends of the sleeve. The disc 10 has its circumference provided with a pin or the like 13, extending into said longitudinal slot 14. The disc 10 is mounted between two discs 16 and 17, the disc 17 being fixed to the shaft 1 by key or spline 17a, and rotating along with said shaft therefor. On the disc 17, a radial pin 15 is mounted, adapted to co-operate locally with the flange 10a of the disc 10, which means, therefore, that the disc 10 is locally deformed when the shaft 1 rotates, as is shown in the upper portion of the figure. During said deformation, therefore, the teeth 11a on the portion 11 are locally brought into engagement with the teeth 12 of the disc 7. As pin 15 sweeps around, it deflects a portion of periphery of disc 10 progressively to progressively engage some teeth 11a of disc 10 with some teeth 12 of disc 7.

The ratio of the number of teeth of the co-operating elements 10 and 7, and 5 and 6, respectively, has been so chosen that when the one zone of contact performs a complete revolution, viz. the contact of teeth on disc 10 on the one hand, and the contact of the flat toothed wheel 6 on the other hand, said flat toothed wheel and the disc 7 co-operating with the disc 10, respectively, is displaced over a small distance. If, for example, the disc 10 has n teeth and has performed a complete revolution of contact with teeth of disc 7, the co-operating disc 7 will have been displaced less than n teeth. If, as in the present case, the central shaft is used as a drive for the second hand of a time piece, the ratio of the number of teeth on the discs 10 and 7 will be chosen as 59:60. During each complete revolution of the shaft 1, therefore, the disc 7 will be displaced over 1/60 of its circumference, which corresponds with the displacement of one minute over the face of a clock, since shaft 1 is driven one revolution in a minute. Because the flat toothed wheel 6 coupled with the disc 7 performs an eccentric movement, a rolling of the teeth on the circumference of this disc over the teeth of the toothed ring 5 will take place. The ratio of the number of teeth on the disc 6 and on the toothed ring 5 has been so chosen that when the disc 6 performs a complete revolution, this disc as a result of the eccentric movement after a complete revolution of the disc 7 is displaced over 1/12 of the circumference. In the present case, the disc 6 is provided with twelve teeth and the toothed ring 5 with eleven teeth. The ratio here, therefore, is 12:11 or $n:(n-1)$. On the shoulder or sleeve 8 of the disc 7 is a minute hand 21, and on the shoulder or sleeve 9 of the disc 6 the hour hand 22 is provided, so that when the shaft 1 is driven constantly with a speed of one revolution per minute, a correct time indication is obtained. A second hand 20 may be mounted on shaft 1. The number of parts used has been reduced to a minimum and these parts are of a simple construction. The whole may be made from a transparent synthetic material, which has the particular effect that it is possible from the outside to see the toothed wheels and the toothed discs operate. The toothed disc 10 also easily admits of being deformed then and will return to its flat position under its own resilience. It may be made of "Nylar."

As has been observed before, the central shaft 1 may be driven by a synchronous electric motor M or by a spring motor. Between the motor and the shaft 1, a flexible shaft 30 may be provided, if desired, or the shaft may be driven by a rope or belt. The motor, for example, may then be mounted in a supporting base B and thus be hidden from view. The use of a flexible shaft has the advantage that one is relatively free in the arrangement of the motor. If desired, one motor may drive a number of shafts. Thus, flexible shaft 30 may be housed in a curved tube 35 interconnecting the base B with casing 2 (Fig. 6). A clock frame 40b may be mounted on base B with casing 2 at the center thereof. Curved tube 35 may be screwed as at 35a to sleeve 36 which is fixed to portion 3 of casing 2, as by screw 36a.

Normally, the sleeve 40 does not turn as the pin 15 sweeps around, and hence disc 10 is stationary. However, if the clock must be set to the correct time, the minute hand 21 can be turned thereby turning the disc 7 and the disc 10 with it. Pin 13 will then turn sleeve or ring 40. Thus, the minute hand may be brought to any desired position, and will move the hour hand correspondingly, because disc 10 will turn during the setting and will be deflected by pin 15, since said disc 10 will be moving relative to said pin. The relationship between the minute, hour and second hands is thus maintained during the setting.

In Figs. 7 and 8 there is shown a modified construction the purpose of which is to reduce the friction. Instead of using the split sleeve 40, a split wire ring 40a may be employed. The split ring 40a may fit into an annular groove 100 formed in cylindrical casing wall 101, which corresponds to the cylindrical casing wall 2b of Figs. 1-6. The disc 10 of Figs. 7 and 8 is similar to disc 10 of Figs. 1-6 and it is also provided with pin 13 which extends in the space 102 between the adjacent ends of the split ring 40a. The space 102 between the inner or adjacent ends of the split ring 40a corresponds to the longitudinal slot 14. The wire 40a may be of round stock and thus have only three lines of contact with the surfaces of square groove 100, thereby reducing the friction. The wire 40a also tends to expand so that it will maintain its position unless the minute hand is rotated. Thus, if the lubricant should dry there would not be too much friction to prevent setting the clock to correct time.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention I claim as new and desire to secure by Letters Patent:

1. In combination, a disc having a circle of teeth on one face thereof, said disc being made of deformable, resilient material, means to retain said disc against rotation, a second disc co-axial with the first disc and rotatable about its axis, said second disc having on the face thereof facing said one face of the first disc a circle of teeth opposed to the circle of teeth on the first disc, the number of teeth on one disc differing from the number of teeth in said other disc, and means rotatable about the axis of said discs for progressively deflecting a portion of the first disc annularly toward the second disc to progressively move more of the teeth of the first disc against the teeth of the second disc, whereby to cause the second disc to rotate about its axis.

2. The combination of claim 1, in combination with a toothed member mounted for rotation eccentrically on said second disc, and a fixed toothed member co-axial with said first and second discs and having a number of teeth differing from the number of teeth on said eccentric co-axially mounted member, and teeth on said fixed member and eccentric co-axially mounted member having progressive engagement, annularly as said second disc is rotated whereby to rotate said eccentrically mounted member.

3. The combination of claim 1, the number of teeth in said first disc being one less than the number of teeth in said second disc.

4. The combination of claim 1, the number of teeth on the first disc being fifty-nine, the number of teeth on the second disc being sixty.

5. The combination of claim 2, the number of teeth on the first disc being fifty-nine, the number of teeth on the second disc being sixty, said eccentrically mounted toothed member having twelve teeth, said fixed toothed member having eleven teeth.

6. The combination of claim 5, in combination with synchronous motor means to rotate said deflecting means.

7. The combination of claim 6, in combination with a second hand rotatable with said rotating deflecting means, a minute hand on said second disc and rotatable therewith, and an hour hand on said eccentrically mounted member and rotatable therewith.

8. The combination of claim 6, in combination with a flexible drive shaft connecting said synchronous motor with said deflecting means.

9. In combination, a fixed support, a shaft rotatably mounted on said support, a radial pin fixed relative to the shaft and rotatable therewith, a disc mounted on said shaft, means to fix the disc to the support against rotation relative thereto, said disc being made of flexible material and being formed with peripheral teeth at a side thereof, and a second disc rotatably mounted on the shaft and having peripheral teeth at a side thereof facing the side of the first disc formed with teeth, the teeth of the first disc being pressed into engagement with the teeth of the second disc by said pin, progressively, as said pin is rotated with said shaft, the teeth in the second disc being one more in number than the teeth in the first disc.

10. In combination, a rotatable shaft, a pair of discs on said shaft, means to retain one of said discs against rotation, said one of said discs being made of flexible, resilient material and having peripheral teeth on the side thereof facing said other disc, said other disc having peripheral teeth on the side thereof facing the first disc, and means rotatable with the shaft for progressively deflecting a peripheral portion of the first disc towards the second disc to engage the teeth of the first disc with the teeth of the second disc at the point of deflection, progressively, as the shaft rotates.

11. In combination with claim 10, the teeth of the first disc being one less in number than the teeth in the second disc.

12. The combination of claim 10, said first disc having fifty-nine teeth, and said second disc having sixty teeth.

13. In combination, a fixed casing, a shaft journalled therein, a radial pin fixed to the shaft and rotatable therewith, a flexible resilient disc on the shaft and within the casing, means to retain said disc against rotation, said pin engaging a peripheral portion of the disc at one side thereof and deflecting said disc at the point of contact progressively as the shaft rotates, towards the opposite side, said disc being formed with peripheral teeth at said opposite side, a second disc rotatable on said shaft and disposed within the casing and being opposed to the first disc and having gear teeth on the side thereof facing the first disc, and the teeth on the first disc at the deflected portion thereof meshing with the teeth of the second disc, said second disc having one more tooth than the first disc.

14. The combination of claim 13, an eccentric hub fixed to the second disc and rotatable therewith, a third disc rotatably mounted on the eccentric hub and being formed with outwardly extending radial teeth, and a toothed ring fixed to the casing and being coaxial with said shaft and having inwardly projecting radial teeth eccentrically meshing with the teeth of the third disc, said third disc having one more tooth than the number of teeth in said toothed ring.

15. The combination of claim 14, the number of teeth of the flexible disc being fifty-nine, the number of teeth in the second disc being sixty, the number of teeth in the third disc being twelve, and the number of teeth in the toothed ring being eleven.

16. The combination of claim 14, in combination with a second hand on said shaft, a minute hand fixed to rotate with said second disc, and an hour hand fixed to rotate with the third disc.

17. In combination, a disc having a circle of teeth on one face thereof, said disc being made of deformable, resilient material, means to retain said disc against rotation, a second disc co-axial with the first disc and rotatable about its axis, said second disc having on the face thereof facing said one face of the first disc a circle of teeth opposed to the circle of teeth on the first disc, the number of teeth on one disc differing from the number of teeth in said other disc, and means rotatable about the axis of said discs for progressively deflecting a portion of the first disc annularly toward the second disc to progressively move more of the teeth of the first disc against the teeth of the second disc, whereby to cause the second disc to rotate about its axis, and means to angularly adjust said retaining means and disc.

18. In combination, a fixed support, a shaft rotatably mounted on said support, a radial pin fixed relative to the shaft and rotatable therewith, a disc mounted on said shaft, means to fix the disc to the support against rotation relative thereto, said disc being made of flexible material and being formed with peripheral teeth at a side thereof, and a second disc rotatably mounted on the shaft and having peripheral teeth at a side thereof facing the side of the first disc formed with teeth, the teeth of the first disc being pressed into engagement with the teeth of the second disc by said pin, progressively, as said pin is rotated with said shaft, the teeth in the second disc being one more in number than the teeth in the first disc, and means to angularly adjust said disc retaining means and disc relative to said casing.

19. In combination, a fixed casing, a shaft journalled therein, a radial pin fixed to the shaft and rotatable therewith, a flexible resilient disc on the shaft and within the casing, means to retain said disc against rotation, said pin engaging a peripheral portion of the disc at one side thereof and deflecting said disc at the point of contact progressively as the shaft rotates, towards the opposite side, said disc being formed with peripheral teeth at said opposite side, a second disc rotatable on said shaft and disposed within the casing and being opposed to the first disc and having gear teeth on the side thereof facing the first disc, and the teeth on the first disc at the deflected portion thereof meshing with the teeth of the second disc, said second disc having one more tooth than the first disc, and means to angularly adjust said disc retaining means and disc relative to said casing.

20. In combination, a casing having a cylindrical wall, a shaft journalled coaxially of said casing, a radial pin fixed to the shaft and rotatable therewith, a flexible disc on the shaft and within the casing, a split ring within the casing and frictionally engaging the inner surface of said casing, means on said disc projecting between the adjacent ends of said split ring, said pin engaging a peripheral portion of the disc at one side thereof and deflecting said disc at the point of contact progressively as the shaft rotates, said disc being formed with peripheral teeth at said oppoiste side, a second disc rotatable on said shaft and disposed within the casing and being opposed to the first disc and having gear teeth on the side thereof facing the first disc, and the teeth on the first disc at the deflected portion thereof meshing with the teeth of the second disc, said second disc having one more tooth than the first disc.

21. In a clock having a minute hand, and a drive shaft, the combination of a cylindrical casing surrounding said drive shaft, gear reduction means located within said casing, and slippage providing means for said minute hand, said gear reduction means including a first disc rotatably mounted on said drive shaft, a second disc rotatably mounted on said drive shaft, said discs being provided with oppositely disposed face teeth, spacing means to space said discs from each other so that the face teeth of each are normally out of engagement with each other, said first disc being deformable at its periphery, and means secured to said drive shaft and engaging said first disc at its periphery to deform the same so that the face teeth thereof will mesh with the face teeth of said second disc, the number of teeth on said two discs being different from each other so as to provide a differential rotation of said second disc with respect to said drive shaft during normal operation, and said slippage providing means comprising a ring frictionally engaging the inner surface of said cylindrical casing and surrounding said first disc, means connecting said first disc and said ring to maintain said first disc stationary during the rotation of said deforming means, and means connecting said second disc to said minute hand, whereby the force applied to said first disc by the manual rotation of said minute hand and of said second disc will overcome the frictional engagement between the contracting surfaces of said ring and said cylindrical housing to permit rotation of both discs and consequent slippage of said minute hand.

References Cited in the file of this patent

FOREIGN PATENTS

| | | | |
|---|---|---|---|
| 625,820 | France | Aug. 20, | 1927 |
| 174,873 | Great Britain | Feb. 9, | 1922 |